(12) United States Patent  
Pettingill

(10) Patent No.: US 7,896,492 B2  
(45) Date of Patent: Mar. 1, 2011

(54) DUAL STRAP EYEWEAR AND IDENTIFICATION STRAP HOLDER

(75) Inventor: Bernard Frances Pettingill, Palm Beach Gardens, FL (US)

(73) Assignee: Bernard Pettingill, Palm Beach Gardens, FL (US)

( * ) Notice: Subject to any disclaimer, the term of this patent is extended or adjusted under 35 U.S.C. 154(b) by 0 days.

(21) Appl. No.: 12/145,854

(22) Filed: Jun. 25, 2008

(65) Prior Publication Data

US 2009/0323018 A1   Dec. 31, 2009

(51) Int. Cl.  
*G02C 3/00* (2006.01)
(52) U.S. Cl. .................................. 351/157; 351/158
(58) Field of Classification Search ............. 351/41, 351/156–158  
See application file for complete search history.

(56) References Cited

U.S. PATENT DOCUMENTS

| 1,455,879 | A | * | 5/1923 | Gronlund | ..................... 24/3.13 |
| 4,974,956 | A | * | 12/1990 | Gill | ............................. 351/156 |
| 7,594,724 | B2 | * | 9/2009 | Purcell | ....................... 351/156 |

* cited by examiner

*Primary Examiner*—Huy K Mai

(57) ABSTRACT

Eyewear holder plus conference/meeting identification dual strap or item(s) holder for securing eyewear, such as, but not limited to, prescription or non-prescription eyewear, as well as a lanyard attachment, such as, but not limited to (plastic/rubber ring, clip, swivel, J-hook, Bulldog or other) for holding identification or item(s) to neck with a double to single strap design (with or without printing/sewing on strap) and (in various strap colors and/or materials—such as, but not limited to polyester, chain, cotton, neoprene, precious stone, nylon, elastic, alloy, leather, composite, laminate or some combination) and an adjustment block to aid in fastening around one's neck for easy adjustment.

2 Claims, 3 Drawing Sheets

DUAL STRAP EYEWEAR AND IDENTIFICATION STRAP HOLDER

CROSS-REFERENCE TO RELATED APPLICATIONS

Purcell (U.S. Pat. No. 7,594,724).

BACKGROUND OF THE INVENTION

Field of the Invention

The present invention relates to eyewear holder and identification badge or item(s) holder; with the advantage of having a single to two straps design to hold eyewear and a lanyard to hold identification or item(s) are significantly better than two separate straps. Also, the elimination of a second strap to hold other item(s) makes this invention user friendly to individuals who need both eyewear and conference identification or item(s). In particular, this invention would have a useful application for law enforcement, sporting enthusiast, conference attendees, rescue workers and other individuals, who routinely need eyewear and identification/item(s) quickly at hand.

Safety and security, knowing that eyewear is readily available for use and proper identification is displayed, which creates a sense of security for the user and participants. For example, a conference worker, who frequently works with a large number of people or an organization requiring on-going identification and has eyewear as well as maintain proper identification, can benefit from this invention. Millions of people wear eyewear for vision correction or protection plus identification or holding item(s) on a daily basis. In this case, the user requires a place to hold or store identification/item(s) and eyewear at the same time. For this reason. This invention would be ideal.

While some types of eyewear are very bulky and difficult to store, eyewear cases are available, single straps are also on the market, which move about the neck of a user and hold the eyewear. However, eyewear cases are impractical to carry on one's person and multiple straps are bulky; therefore by utilizing this invention, one can eliminate this added bulk and confusion.

The present invention addresses these and other deficiencies associated with stated problems of maintaining eyewear and identification/item(s) suspended simultaneously.

BRIEF SUMMARY OF THE INVENTION

Eyewear and identification tags/item(s) need to be accessible in today's busy and security conscious world with quick access, which this invention is designed to provide. The preferable embodiment of the invention contains an adjustable sliding block made of natural or synthetic material, plus a strap that goes around one's neck with connectors that are expandable and can accommodate every user for eyewear plus a lanyard for identification/item(s).

The eyewear strap is fabricated from resilient material, such as, but not limited, polyester, chain, cotton, neoprene, precious stone, nylon, elastic, alloy, leather, composite, laminate or some combination. In the presently preferred embodiment, the adjustment block has a diameter of approximately 0.5 inches; the strap has a length of approximately 20 inches; and the connectors are 1.5 inches in length.

BRIEF DESCRIPTION OF THE SEVERAL VIEWS OF THE DRAWING(S)

DETAILED DESCRIPTION OF THE INVENTION

Figure 1:
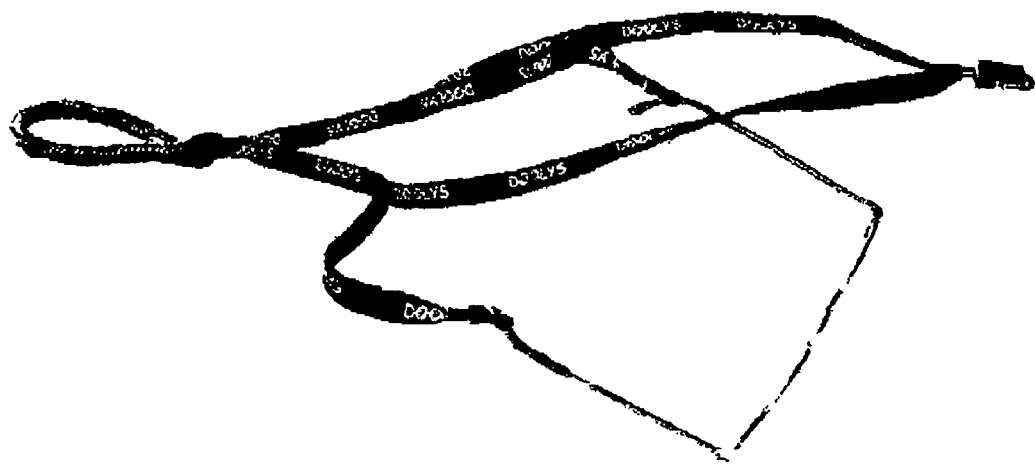
FIG. 1 is a perspective view showing the dual to single strap embodiment of the invention holding various types of eyewear and lanyard ends for identification or item(s) attachment.

The detailed description sets forth below in connection with the drawing, which is intended to describe the preferred embodiment of this invention; it is not intended to represent the only form in which the present invention may be constructed or utilized. It is understood, however, that the same or equivalent functions may be accomplished by slightly different embodiments, utilizing different materials, which can be accomplish within the spirit and scope of the invention, the intended outcome, i.e. securing eyewear with a lanyard for identification/item(s) suspended onto the same strap.

FIG. 1 illustrates the overall arrangement of the invention, which holds eyewear plus a lanyard. Many types of straps could be used with the connectors, such as but not limited to polyester, chain, cotton, neoprene, precious stone, nylon, elastic, alloy, leather, composite, laminate or some combination of the above.

Figure 2:
FIG. 2 is a view of lanyard end for attaching identification/item(s)

FIG. 2 provides a view of the lanyard, which can be of many different types, such as, but not limited to, plastic/rubber ring, clip, swivel, J-hook, bulldog clip metal, gold, silver, precious stones or other.

Figure 3:
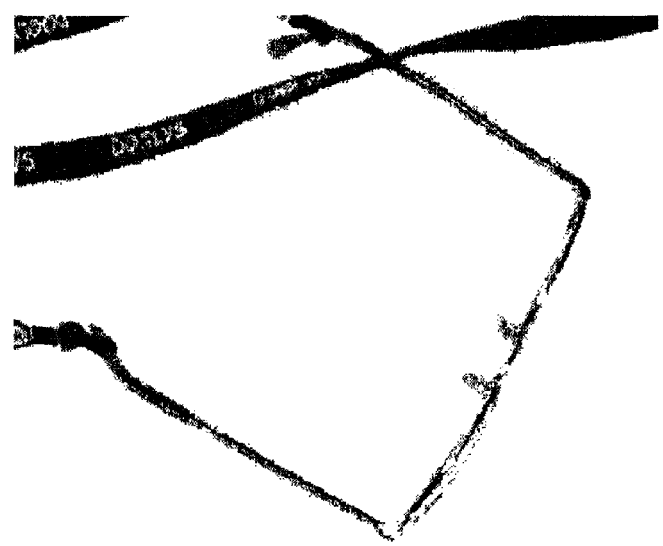
FIG. 3 is a view of eyewear.

FIG. 3 provides a view of the eyewear, which can be of many different types, such as, but not limited to, safety eyewear, sun eyewear, sport eyewear, prescription eyewear for nearsighted/farsighted and non-prescription eyewear.

Figure 4:
FIG. 4 is a view of the connector to strap for lanyard in FIG. 2.

FIG. 4 provides a view of the connectors, which holds lanyard to a single strap. This connector is made of a rubberized or metal material, which fastens onto the end.

Figure 5:
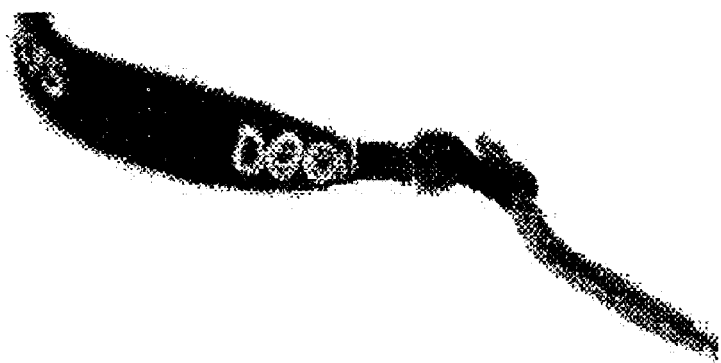
FIG. 5 is a view of the connector to strap for eyewear in FIG. 3.

FIG. 5 provides a view of the second set of connectors, which holds the eyewear to the strap. This connector is also made of a rubberized or metal material, which fastens onto the earpiece, thereby accommodating the eyewear to the strap.

Figure 6:
FIG. 6 is a view of the straps, which splits for the connectors in FIG. 4 and FIG. 5.

FIG. 6 provides a view of the strap, which goes from the eyewear onto one strap; from the lanyard onto the one strap and then the straps joins eventually onto the adjustment block. The straps are joined by stitching, cement or combination.

Figure 7:
FIG. 7 is a view of the adjustment block for the strap in FIG. 6.

FIG. 7 demonstrates the strap, which fits onto the adjustment block and then is secured around one's neck.

The invention claimed is:

1. A dual eyewear strap around the neck of a user for holding a pair of eyeglasses having temples, comprising:
    a single foldable strap having a first end portion and a second end portion, each of said first and second end portions splits into double strap ends, the first one of the first double strap ends coupled to the first temples of said eyeglasses, the first one of the second double strap ends coupled to the second temple of said eyeglasses, the second one of the first double strap ends and the second one of the second double strap ends are coupled together to form a lanyard end for a personal items; and a adjustment block being capable of sliding on the folded single strap for adjusting the strap length between two temples of said eyeglasses.

2. A dual eyewear strap around the neck of a user as claimed in claim 1, wherein the personal items is selected from the group of an identification, a whistle, a watch, a magnifying glass, binoculars, a medication bottle, a safety call button, a key, a compass and a pen for quick access, security and utilization with both eyewear and items hanging on the user's chest when not utilized.

* * * * *